Patented Nov. 27, 1928.

1,693,252

UNITED STATES PATENT OFFICE.

WILLIS O. PROUTY, OF HERMOSA BEACH, CALIFORNIA, ASSIGNOR, BY MESNE ASSIGNMENTS, TO AMERICAN ENCAUSTIC TILING COMPANY, LTD., OF LOS ANGELES, CALIFORNIA, A CORPORATION OF NEW YORK.

CERAMIC-GLAZING PROCESS.

No Drawing. Application filed May 6, 1925. Serial No. 28,500.

My invention relates to improved means for producing glazed ceramic products wherein a plurality of colors, shades or tints are so distributed as to produce a granular, flocculent or clouded appearance depending upon the particular form of my process which is used and the particular manner in which it is used. At the base of my improved process in all of its forms there lies the use in the glaze mixture of some material which is eliminated in firing the glaze, such elimination occurring either by evaporation or combustion. The initial presence of this material in or between the separately applied layers of glaze mixture of different colors, shades or tints all of which including white I will hereinafter refer to as colors, serves to prevent the different colors from merging into a homogeneous mass in firing, but before the material referred to has been eliminated by distillation or combustion the differently colored glazes will have merged to the extent of producing upon the face of the finished product intermingled areas of the colors of the glazes used. By varying the application of the process the configuration and size of the different color areas may be varied from a relatively fine-grained effect, which may be described as granular or flocculent, to an effect in larger masses. I will herein describe two specific applications of the use of a material initially present in the glaze mixture but which is eliminated in firing with the production of the effects above described, and in the description I will refer particularly to the manufacture of wall tile to which purpose the invention has been quite extensively applied.

My process is not limited to the use of any particular glaze and the ingredients and proportions stated herein are merely illustrative of particular applications of the invention, the method being equally applicable with glazes formed of different ingredients, the ingredients in different proportions and of any selected colors.

A glaze having a granular or flocculent appearance made up of blue and pink or violet may be produced by the following described procedure. The base of the glaze may consist of 150 parts by weight of feldspar, 120 of borax, 20 of soda ash, 140 of silica, 180 of white lead, 20 of zinc oxide and 40 of clay. A coating of this base, colored blue by the addition of about a quarter of one per cent of cobalt, may first be applied to the bisque of the tile by dipping or any convenient means of application. In a few moments, that is as soon as the excess water in the glaze mixture has been absorbed in the bisque, I apply by any suitable method a coating of the base above described to which there has been added a small proportion of an opacifier such as tin oxide to the extent of, say, four per cent, and about 5 to 15 per cent of starch. The tin oxide gives the opacity necessary for a white glaze and the starch is an example of a substance suitable for use as the agency which initially breaks the continuity of the differently colored glazes but which disappears in firing. The tin oxide should, of course, be milled with the base. The starch, in water suspension, may simply be stirred in afterwards. Over this second coating I apply, preferably by spraying, a layer of the same base containing either 10 per cent of pink stain for pink, or one per cent of manganese dioxide for violet. The application of this third layer by spraying is a matter of considerable importance in that it insures a sufficient uniformity in the distribution of color. The tile so prepared is fired in the glaze kiln in the usual manner and the finished tile so produced has the flocculent or granular distribution of color in the glaze above described.

A distribution of the color areas different from that above described may be obtained by the use of a material which is incorporated in the glaze mixture in distinct separate masses instead of forming a more or less continuous stratum throughout the coating of glaze mixture. For instance, if particles of sawdust be distributed in the mass of different glaze mixtures the disappearance of the saw-dust in firing results in a distribution and configuration of the color areas quite different from that produced by the above described use of starch, starch being a substance which disseminates evenly throughout a mass of water in which it is held in colloid suspension. As an example of the use of saw-dust or similar substance, a blue glaze mixture such as above described may be used for the first layer upon the bisque. This first layer is applied by dipping the tile in the blue glaze mixture after a quantity of saw-dust has been sprinkled over and lies upon and near the surface of the mixture in the dipping pan. The quantity of saw-dust and its degree of fineness will influence the effect produced. The resulting layer of glaze mixture on the bisque contains grains of saw-dust. It will be necessary from time to time to sprinkle additional saw-dust over the surface of the mixture in which the tile is being dipped, and it may sometimes be necessary to separate out from the glaze mixture the saw-dust which sinks and becomes mixed with the body of the mixture. Over the layer of glaze mixture containing saw-dust a layer of a differently colored glaze mixture, such as the pink or violet above referred to, is applied either by dipping, spraying or any of the usual methods. If the first layer of glaze mixture containing the saw-dust be prepared with an excess of clay as used in the production of a matt surface the pattern formed on the tile by the different colors will be relatively sharp in outline, that is, the different color areas will not gradually blend together; while if the glaze layer containing saw-dust contain a lesser amount of clay as used in the production of a gloss surface the different color areas will blend together gradually producing a softer effect. Intermediate effects may be produced by varying the amount of clay.

Substances of the two classes used by me, such as starch and saw-dust, differ in the manner in which they disseminate through water or a watery mass. Starch being a colloid becomes very evenly distributed, and any substance if reduced to an exceedingly fine powder would become distributed with great uniformity. The saw-dust, however, exists as distinct masses of relatively large size and produces a quite different effect.

What is claimed is:

1. In a process of forming glazed ceramic products having a surface of variegated color the operation of applying to the bisque a coating of glaze mixture of selected color, applying over said first coating a coating of glaze mixture of a different color and containing a material that will be eliminated in the firing of the glaze, applying a third coating of glaze mixture over the second coating and firing the product so prepared.

2. In a process of forming glazed ceramic products having a surface of variegated color the operation of applying to the bisque a coating of glaze mixture of selected color, applying over said first coating a coating of glaze mixture of a different color and containing an insoluble material that will be eliminated in the firing of the glaze, applying a third coating of glaze mixture over the second coating and firing the product so prepared.

3. In a process of forming glazed ceramic products having a surface of variegated color the operation of applying to the bisque a coating of glaze mixture of selected color, applying over said first coating a coating of glaze mixture of a different color and containing starch, applying a third coating of glaze mixture over the second coating and firing the product so prepared.

4. In a process of forming glazed ceramic products having a surface of variegated color the operation of applying to the bisque a coating of glaze mixture of selected color, applying over said first coating a coating of glaze mixture of a different color and containing a material that will be eliminated in the firing of the glaze, spraying a third coating of glaze mixture over the second coating and firing the product so prepared.

5. In a process of forming glazed ceramic products having a surface of variegated color the operation of applying to the bisque a coating of glaze mixture of selected color, applying over said first coating a coating of glaze mixture of a different color and containing an insoluble material that will be eliminated in the firing of the glaze, spraying a third coating of glaze mixture over the second coating and firing the product so prepared.

In testimony whereof, I have subscribed my name.

WILLIS O. PROUTY.